United States Patent
Persson et al.

(10) Patent No.: US 9,877,161 B2
(45) Date of Patent: Jan. 23, 2018

(54) APPARATUS, SYSTEMS AND METHODS FOR MOBILE NETWORK POSITIONING OF MTC DEVICES USING COMMON REFERENCE OR SYNCHRONIZATION SIGNALS

(71) Applicant: Sony Corporation, Tokyo (JP)

(72) Inventors: Magnus Persson, Lund (SE); Basuki Priyanto, Lund (SE); Peter C. Karlsson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/806,091

(22) Filed: Jul. 22, 2015

(65) Prior Publication Data

US 2016/0295374 A1 Oct. 6, 2016

Related U.S. Application Data

(63) Continuation of application No. PCT/EP2015/056891, filed on Mar. 30, 2015.

(51) Int. Cl.
*H04W 24/00* (2009.01)
*H04W 4/02* (2009.01)
(Continued)

(52) U.S. Cl.
CPC ........... *H04W 4/028* (2013.01); *G01S 5/0036* (2013.01); *G01S 5/06* (2013.01); *H04W 4/005* (2013.01); *H04W 64/00* (2013.01)

(58) Field of Classification Search
USPC ......... 455/404.2, 433, 436, 440, 442, 452.2, 455/453, 456.1–456.3, 457
See application file for complete search history.

(56) References Cited

U.S. PATENT DOCUMENTS

2008/0158060 A1* 7/2008 Lee .................... G01S 5/06
342/450
2010/0260154 A1* 10/2010 Frank .................. G01S 5/10
370/336

(Continued)

FOREIGN PATENT DOCUMENTS

WO 2011139201 A1 11/2011

OTHER PUBLICATIONS

Huawei et al: "OTDOA enhancements for indoor positioning", 3GPP Draft; R1-151870, 3rd Generation Partnership Project (3GPP), Mobile Competence Centre ; 650, Route Des Lucioles ; F-06921 Sophia-Antipolis Cedex ; France vol. RAN WG1, no. Belgrade, Serbia; Apr. 20, 2015-Apr. 24, 2015 Apr. 10, 2015, pp. 1-3, XP050949799, Retrieved from the Internet: URL:http://www. 3gpp.org/ftp/tsg_ran/WG1_RL 1/TSGR1 80b/Docs/ [retrieved on Apr. 10, 2015].

(Continued)

*Primary Examiner* — Dai A Phuong
(74) *Attorney, Agent, or Firm* — James C. Edwards; Moore & Van Allen PLLC

(57) ABSTRACT

Embodiments improve User Equipment (UE) positioning accuracy in a mobile communication system by providing for a UE configured to listen for Positioning Reference Signal (PRS) transmissions within an operating bandwidth around Direct Current (DC) sub-carrier and at least one non-PRS transmission including, for example, a CRS or PSS/SSS; receiving, at the UE, PRS and non-PRS(s) transmissions transmitted from base stations within the operating bandwidth; performing, at the UE, Time of Arrival (TOA) measurements for each of the plurality of base stations, wherein the TOA measurements are determined based on the at least one non-PRS transmission; obtaining Observed Time Difference of Arrival (OTDOA) measurements by subtracting TOA for the plurality of base stations from a (Continued)

TOA for a reference base station, and transmitting, from the UE to a Location Server (LS), the OTDOA measurements, wherein the LS performs a positioning estimation of the UE based on the OTDOA measurements.

19 Claims, 6 Drawing Sheets

(51) Int. Cl.
    *G01S 5/00*           (2006.01)
    *G01S 5/06*           (2006.01)
    *H04W 4/00*          (2009.01)
    *H04W 64/00*        (2009.01)

(56) References Cited

U.S. PATENT DOCUMENTS

| | | | | |
|---|---|---|---|---|
| 2010/0311437 | A1* | 12/2010 | Palanki | G01S 5/021 455/456.1 |
| 2011/0286349 | A1* | 11/2011 | Tee | H04W 64/00 370/252 |
| 2012/0057498 | A1* | 3/2012 | Han | G01S 5/0036 370/252 |
| 2012/0122472 | A1* | 5/2012 | Krishnamurthy | H04L 5/0053 455/456.1 |
| 2012/0295642 | A1* | 11/2012 | Takahashi | G01C 21/20 455/456.6 |
| 2013/0033999 | A1 | 2/2013 | Siomina et al. | |
| 2013/0237244 | A1* | 9/2013 | Siomina | G01S 5/0236 455/456.1 |
| 2014/0057664 | A1* | 2/2014 | Pei | H04W 64/006 455/456.5 |
| 2014/0148198 | A1* | 5/2014 | Siomina | H04W 64/00 455/456.1 |
| 2014/0321259 | A1* | 10/2014 | Siomina | H04L 5/0048 370/203 |
| 2014/0349677 | A1* | 11/2014 | Xiao | H04W 4/02 455/456.1 |
| 2016/0142989 | A1* | 5/2016 | Hashemi | H04J 11/0069 370/350 |
| 2016/0174091 | A1* | 6/2016 | Zhang | H04W 36/0094 370/252 |
| 2016/0204920 | A1* | 7/2016 | Benjebbour | H04W 16/28 370/329 |
| 2016/0205691 | A1* | 7/2016 | Darwood | H04W 72/042 455/450 |
| 2016/0337101 | A1* | 11/2016 | Gao | H04L 5/0082 |
| 2017/0201972 | A1* | 7/2017 | Marinier | H04W 36/22 |

OTHER PUBLICATIONS

International Search Report and Written Opinion; Jan. 7, 2016; issued in International Patent Application No. PCT/EP2015/056891.

* cited by examiner

APPARATUS, SYSTEMS AND METHODS FOR MOBILE NETWORK POSITIONING OF MTC DEVICES USING COMMON REFERENCE OR SYNCHRONIZATION SIGNALS

FIELD OF THE INVENTION

In general, embodiments of the invention relate to mobile communication network communications and, more particularly, utilizing multiple reference signals, including common reference signal (CRS) transmissions and/or primary/secondary synchronization signal (PSS/SSS) transmissions from base stations to User Equipment (UE) with the purpose of improving UE positioning accuracy and, specifically positioning accuracy of Machine Type Communication (MTC) devices.

BACKGROUND

Machine Type Communications (MTC) is gaining interest in mobile communication industries. It is projected there will be billions of MTC devices to support Machine to Machine (M2M) devices, in addition to Human to Human (H2H) communications. The primary target for MTC is the Internet of Things (IoT). Examples of MTC uses within the IoT include smart meter devices (e.g., gas meters or electricity meters). MTC may also be used in relation to consumer electronic devices (e.g., smart watches, tracking devices, etc.).

M2M defines a broad label that can be used to describe any technology that enables networked devices to exchange information and perform actions without the manual assistance of humans. Recently, MTC has been discussed in many standardization bodies, including 3GPP ($3^{rd}$ Generation Partnership Project). In the current stage, 3GPP is specifying low cost and enhanced coverage MTC in LTE (Long-Term Evolution) telecommunications. MTC has some benefits over legacy wireless communication technologies, such as conventional mobile communication devices and the like, in particular MTC/M2M devices tend to exhibit low power consumption and are intended to be low cost devices. Specifically, MTC is defined to be operated with a maximum bandwidth of 1.4 MHz (Mega Hertz), which is relatively smaller than legacy LTE devices, such as conventional mobile communication devices that are operated in up to a 20 MHz bandwidth without carrier aggregation.

MTC can be applied to many applications or use-cases, for example smart meters, vending machines, various type of sensors (including human body sensors), tracking devices, etc. Positioning in an MTC device is important, especially when there is a need to locate the device for inventory purpose and/or emergency localization.

3GPP standardization has defined positioning techniques (i.e., determining current location of the device) for LTE telecommunications since LTE release 9. However, positioning techniques that are suitable and designed for MTC devices have not yet been defined. While in many instances MTC devices will be generally stationary devices, in other use cases, the MTC devices may be mobile devices and, in such use cases, the knowledge of the device's position may be equally as important as positioning of legacy UE, such as conventional mobile communication devices. The fact that MTC devices according to 3GPP Rel-13 are being defined to operate with a maximum bandwidth of 1.4 MHz poses unique problems associated with obtaining accurate positioning.

Therefore, a need exists to develop apparatus, systems, methods and the like that will improve UE positioning accuracy and, specifically positioning accuracy of Machine Type Communication (MTC) devices.

BRIEF SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for using reference signal transmissions for positioning determination, such as using common reference signal (CRS), primary synchronization signal (PSS) and/or secondary synchronization signal (SSS) transmissions from base stations to User Equipment (UE) with the purpose of improving UE positioning accuracy and, specifically positioning accuracy of Machine Type Communication (MTC) devices.

The LTE cellular system is commonly deployed with a bandwidth in the range of 10 MHZ or 20 MHz. In such a system, positioning reference signals (PRS) are prevalent throughout the bandwidth. Since MTC devices operate in the narrow 1.4 MHz bandwidth, such devices are only capable of utilizing a small portion of the PRS transmissions—the portion within the 1.4 MHz bandwidth. Embodiments of the present invention provide for utilizing reference signals that are transmitted from the base station (also commonly referred to as eNode-B, base transceiver station or the like) in lieu of, or in addition to, the PRS.

Thus, systems, apparatus, methods, and computer program products herein described in detail below provide for utilizing multiple reference signals for position determination, including using common reference signal (CRS) transmissions and/or primary/secondary synchronization signal (PSS/SSS) transmissions from base stations to User Equipment (UE) with the purpose of improving UE positioning accuracy and, specifically positioning accuracy of Machine Type Communication (MTC) devices.

According to embodiments of the invention, a method for improved User Equipment (UE) positioning accuracy in a mobile communication system includes providing for a UE configured to listen for Positioning Reference Signal (PRS) transmissions within an operating bandwidth around Direct Current (DC) sub-carrier and at least one non-PRS signal; receiving, at the UE, PRS and non-PRS transmissions transmitted from base stations within the operating bandwidth; performing, at the UE, Time of Arrival (TOA) measurements for each of the plurality of base stations, wherein the TOA measurements are determined based on the at least one non-PRS signal; obtaining Observed Time Difference of Arrival (OTDOA) measurements by subtracting TOA from several base stations from TOA of a reference base station, and transmitting, from the UE to a Location Server (LS), the OTDOA measurements, wherein the LS performs a positioning estimation of the UE based on the OTDOA measurements.

In some embodiments, providing for the UE comprises providing for a Machine Type Communications (MTC) UE configured to listen for the PRS transmissions and to listen for the non-PRS signal(s) within the operating bandwidth of approximately 1.4 MHz.

In some embodiments, the non-PRS signal comprises a Common Reference Signal (CRS).

In some embodiments, the non-PRS transmission comprises a plurality of sub-frames and wherein each of the plurality of sub-frames of the non-PRS transmission comprises the CRS.

In some embodiments, the non-PRS signal comprises a synchronization signal. In some such embodiments, the synchronization signal comprises a Primary Synchronization Signal (PSS) and/or a Secondary Synchronization Signal (SSS). In other such embodiments, the synchronization signal transmission comprises a plurality of sub-frames successive in time and wherein every fifth ($5^{th}$) sub-frame comprises the synchronization signal.

In some embodiments, the PRS transmission further comprises a positioning reference signal and wherein performing the OTDOA measurements are further based on the positioning reference signal. In some such embodiments, the method includes receiving, at the UE from the LS, a request for enhanced positioning accuracy; and initiating, at the UE and in response to the request from the LS, performing the OTDOA measurements based on the at least one non-PRS signal. In other such embodiments, the method includes receiving, at the UE from the LS, a window length for performing measurements based on the at least one non-PRS signal; and performing measurements is further based on the received window length. In other embodiments, the method includes receiving, at the UE from the LS, an early/late start indicator, wherein the early/late start indicator indicates an early or late start in relation to a predetermined reference point for a window for performing measurements based on the at least one non-PRS signal; and performing measurements is further based on the received early/late start indicator.

In some embodiments, the non-PRS transmissions comprise a first non-PRS signal and a second non-PRS signal; and performing the OTDOA measurements is based on the first non-PRS signal and the second non-PRS signal. In some such embodiments, the method also includes receiving, at the UE from the LS, a request for enhanced positioning accuracy; and initiating, at the UE and in response to the request from the LS, performing the OTDOA measurements based on the first non-PRS signal and the second non-PRS signal. In some such embodiments, the method includes receiving, at the UE from the LS, a first window length for performing measurements based on the first non-PRS signal; receiving, at the UE from the LS, a second window length for performing measurements based on the second non-PRS signal; and performing measurements is further based on the received first window length and the received second window length. In some of these embodiments, the method includes receiving, at the UE from the LS, an early/late start indicator, wherein the early/late start indicator indicates an early or late start in relation to a predetermined reference point for a window for performing measurements based on the first non-PRS signal or the second non-PRS signal; and performing measurements is further based on the received early/late start indicator.

In some embodiments, the PRS transmission further comprises a positioning reference signal and wherein performing the OTDOA measurements comprises determining a PRS positioning measurement based on the positioning reference signal; determining a non-PRS positioning measurement based on the non-PRS signal; wherein the method further comprises determining a non-PRS measurement quality corresponding to the non-PRS positioning measurement; comparing the non-PRS measurement quality to a measurement quality threshold; wherein transmitting the OTDOA measurements comprises transmitting the PRS positioning measurement; and if the non-PRS measurement quality is greater than the measurement quality threshold, transmitting the non-PRS measurement. In some such embodiments, the method further comprises determining a PRS measurement quality corresponding to the PRS positioning measurement; and wherein the measurement quality threshold is the determined PRS measurement quality. In some of these embodiments, the method further comprises transmitting, from the UE to the LS, the PRS measurement quality and information indicating the PRS measurement quality corresponds to the PRS positioning measurement; and transmitting, from the UE to the LS, the non-PRS measurement quality and information indicating the non-PRS measurement quality corresponds to the non-PRS positioning measurement.

According to embodiments of the invention, a mobile communication system for improved User Equipment (UE) positioning accuracy includes a plurality of base stations (BS); a location server (LS); a user equipment (UE) operably connected to at least one of the base stations, where the user equipment is configured to listen for Positioning Reference Signal (PRS) transmissions within an operating bandwidth around Direct Current (DC) sub-carrier and at least one non-PRS signal; receive PRS and non-PRS transmissions transmitted from at least one of the base stations within the operating bandwidth; perform Time of Arrival (TOA) measurements for each of the plurality of base stations, wherein the TOA measurements are determined based on the at least one non-PRS signal; obtain Observed Time Difference of Arrival (OTDOA) measurements by subtracting a TOA of the base stations from a TOA of a reference base station, and transmit, from the UE to the LS, the OTDOA measurements, where the LS is configured to perform a positioning estimation of the UE based on the OTDOA measurements.

According to embodiments of the invention, a computer program product includes a non-transitory computer-readable medium comprising computer-executable instructions for improved User Equipment (UE) positioning accuracy in a mobile communication system, where the instructions include instructions for providing for a UE configured to listen for Positioning Reference Signal (PRS) transmissions within an operating bandwidth around Direct Current (DC) sub-carrier and at least one non-PRS signal; instructions for receiving, at the UE, PRS and non-PRS transmissions transmitted from base stations within the operating bandwidth; instructions for performing, at the UE, Time of Arrival (TOA) measurements for each of the plurality of base stations, wherein the TOA measurements are determined based on the at least one non-PRS signal; instructions for obtaining Observed Time Difference of Arrival (OTDOA) measurements by subtracting TOA for the base stations from a TOA of a reference base station, and instructions for transmitting, from the UE to a Location Server (LS), the OTDOA measurements, wherein the LS performs a positioning estimation of the UE based on the OTDOA measurements.

BRIEF DESCRIPTION OF THE DRAWINGS

Figure 1A:
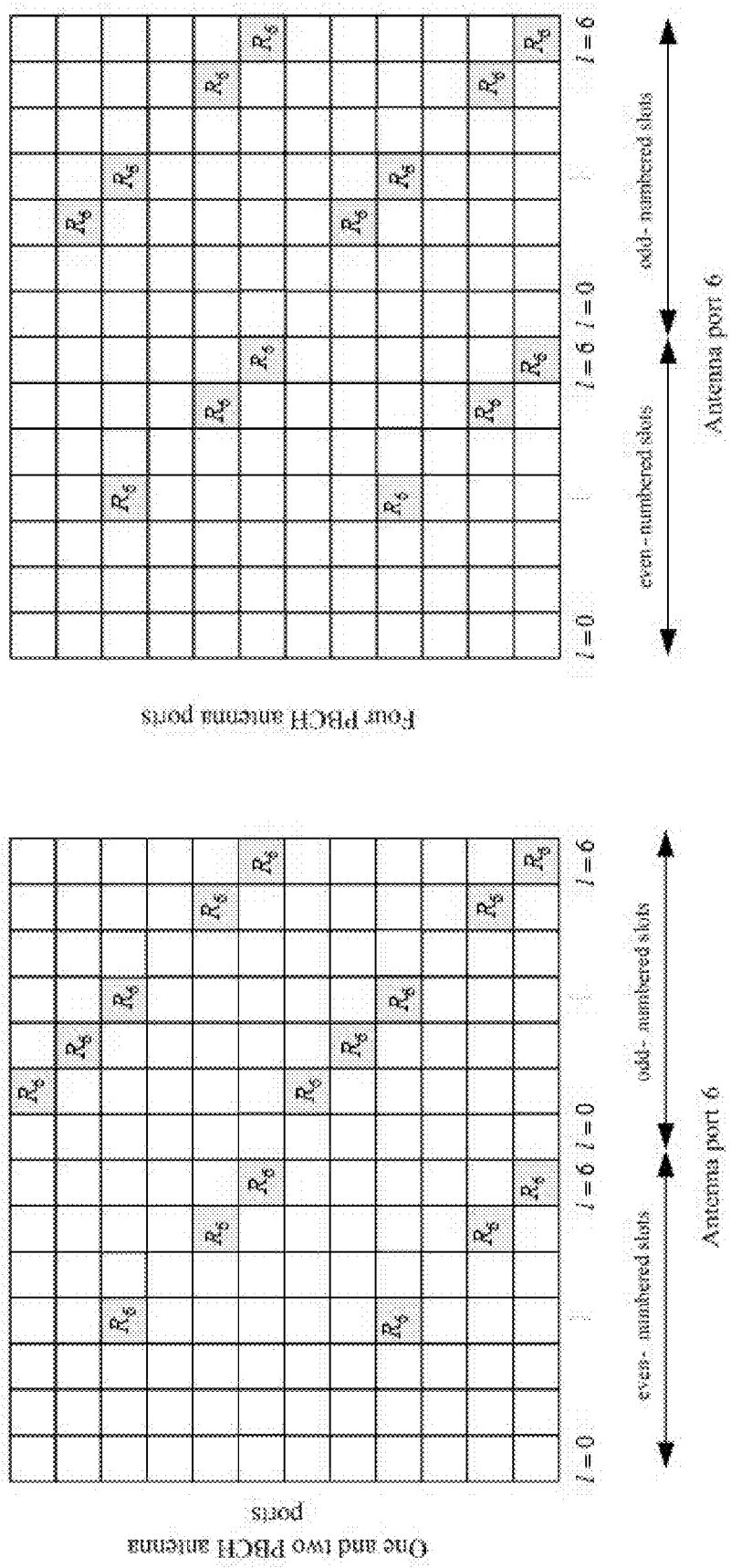
Figure 1B:
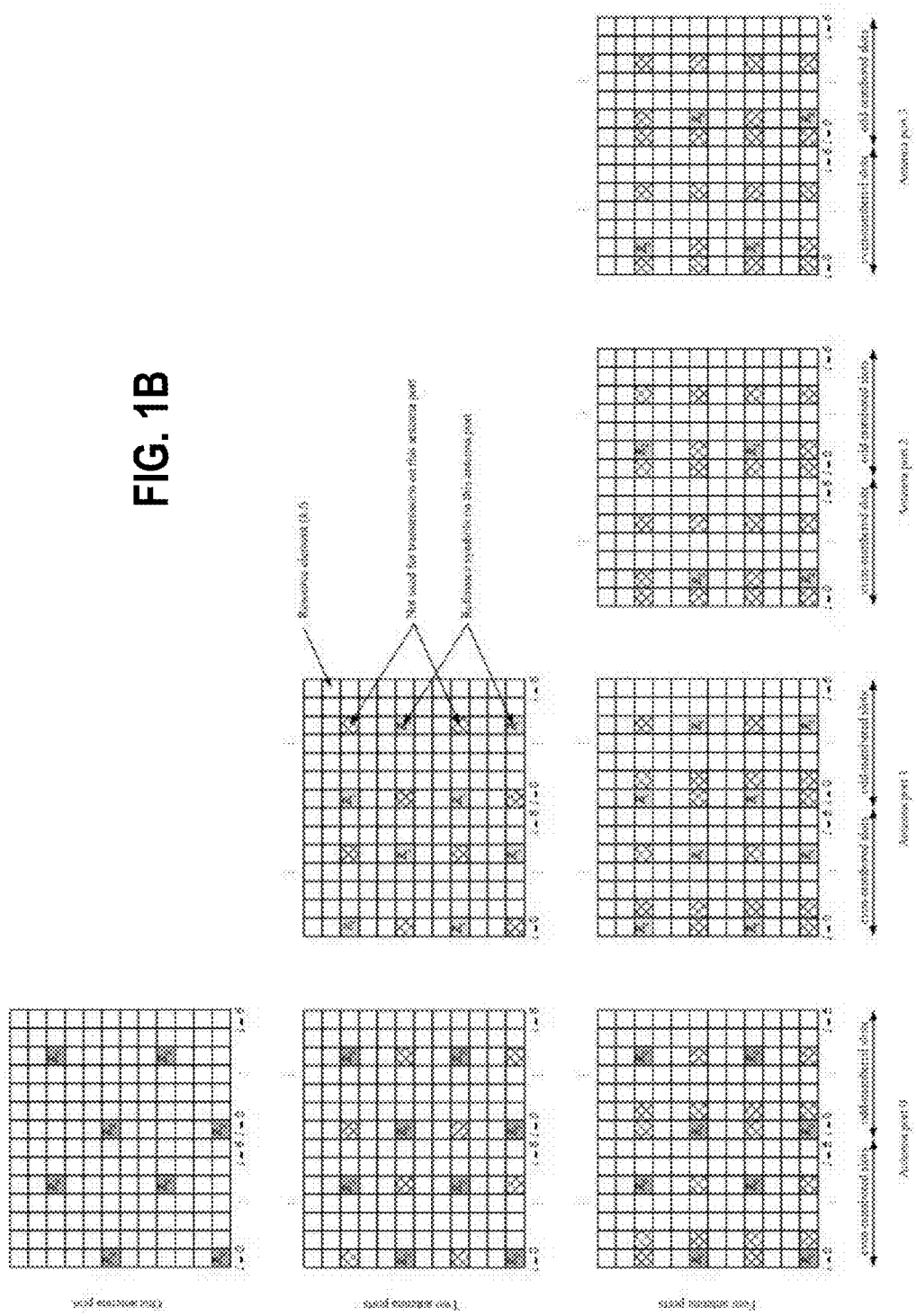
Figure 1C:
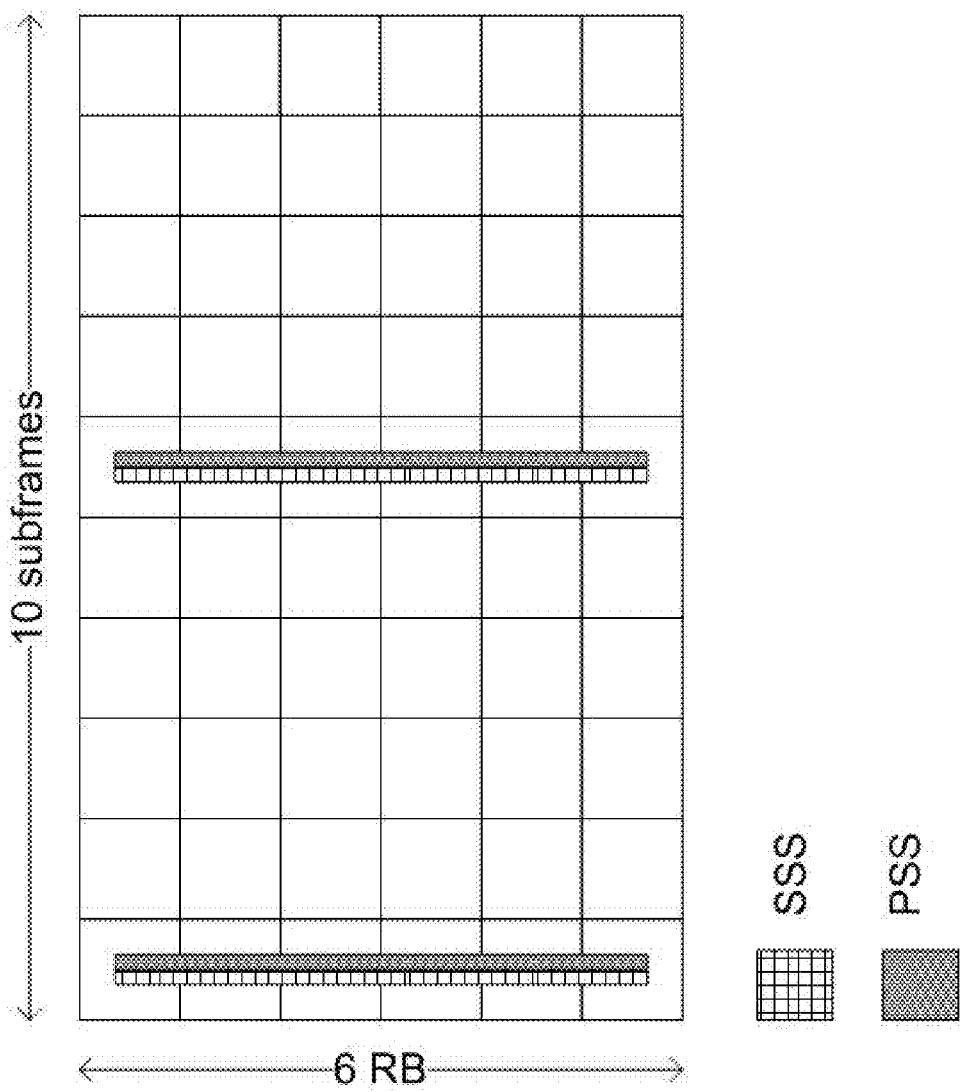
Figure 2:
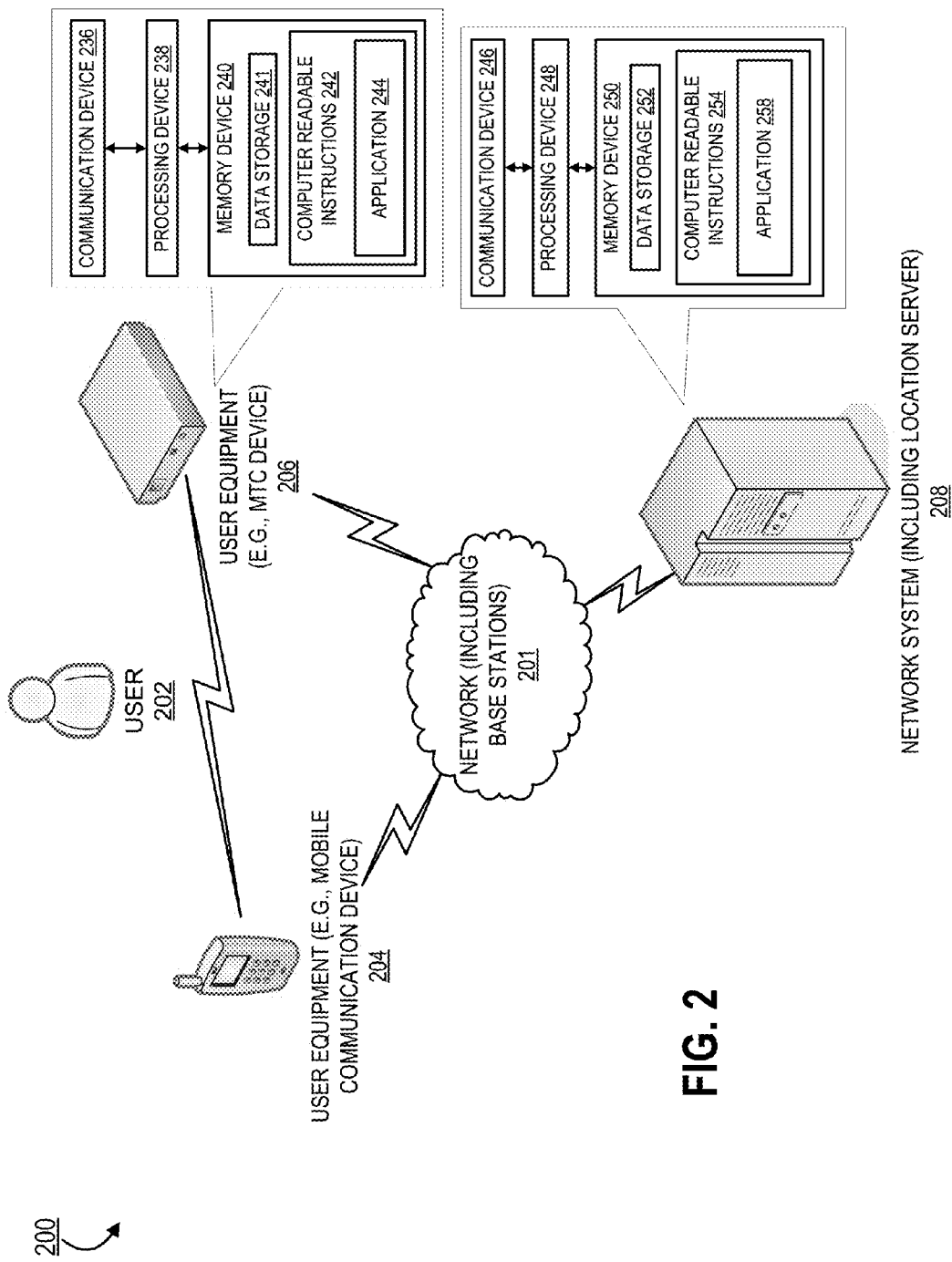
Figure 3:
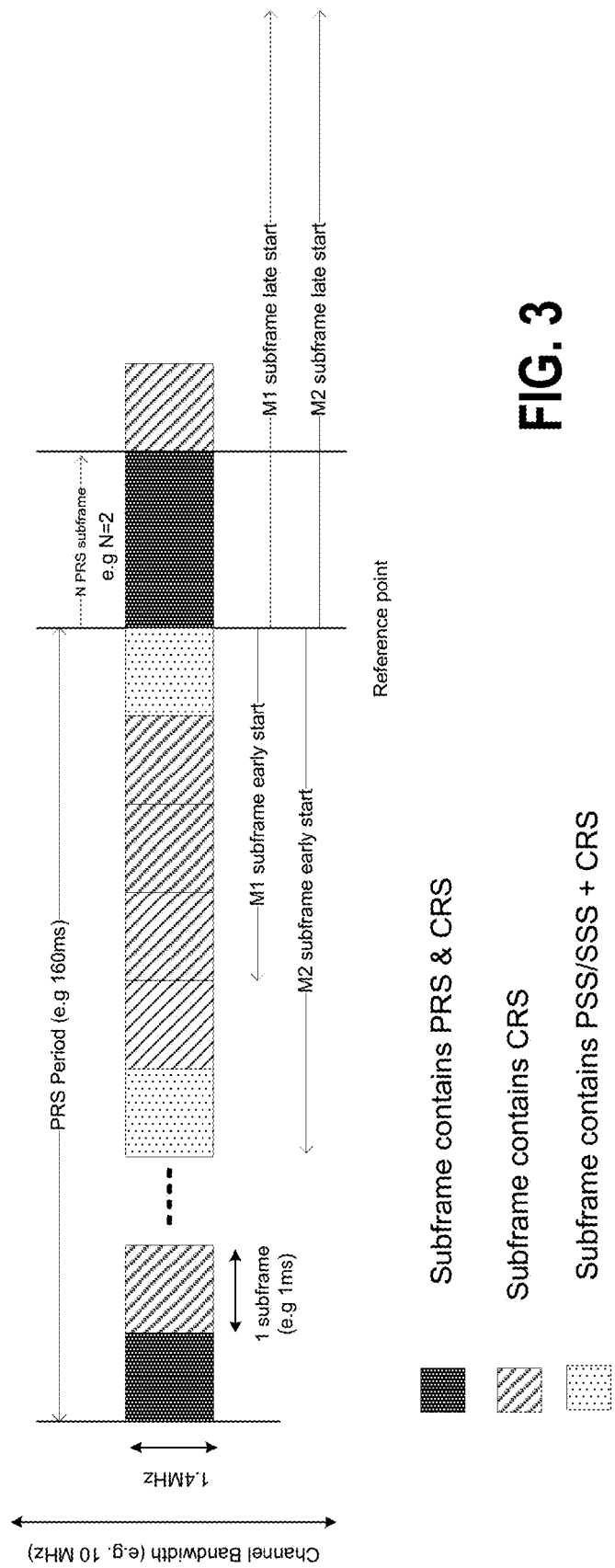
Figure 4:
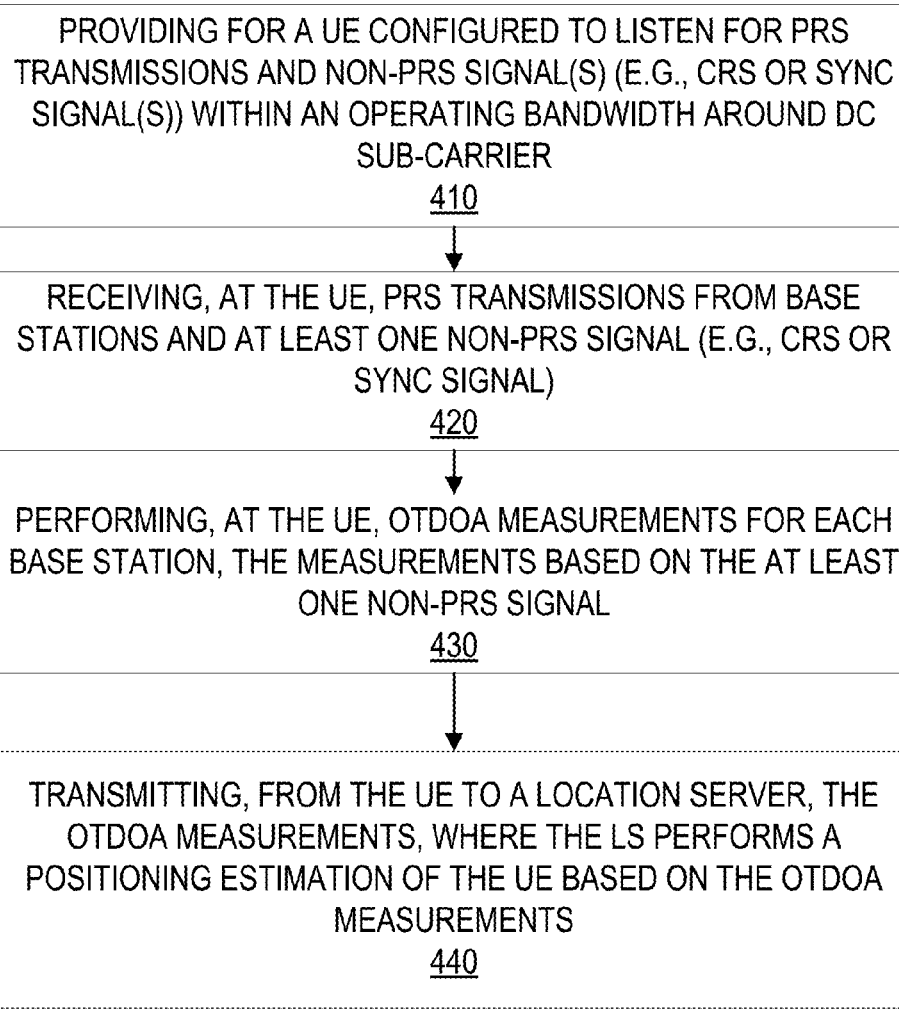

Having thus described embodiments of the invention in general terms, reference will now be made to the accompanying drawings, where:

FIG. 1A is a mapping of Positioning Reference Signals (PRS), in accordance with the prior art;

FIG. 1B is a mapping of Common Reference Signals (CRS), in accordance with the prior art;

FIG. 1C is a mapping of Primary Synchronization Signals (PSS) and Secondary Synchronization Signals (SSS), in accordance with the prior art;

FIG. 2 is a diagram of a User Equipment (UE), such as a Machine Type Communication (MTC) device, operating in an environment, in accordance with embodiments of the present invention;

FIG. 3 illustrates an exemplary reference signal transmission, in accordance with embodiments of the present invention; and FIG. 4 is a flowchart illustrating a method for improving User Equipment (UE) positioning accuracy in a mobile communication system in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A device may be referred to as a node or user equipment ("UE"). For the purpose of sending or receiving data, the device may connect to a wireless local area network ("WLAN") or a mobile communication network (including evolution of 3GPP LTE releases and $5^{th}$ Generation ("5G") LTE releases). Any network described herein may have one or more base stations ("BS") and/or access points ("AP").

As discussed in detail herein, the present invention provides for Positioning Reference Signal (PRS) transmissions, common reference signal (CRS) transmissions and/or primary/secondary synchronization signal (PSS/SSS) transmissions from base stations to User Equipment (UE) with the purpose of improving UE positioning accuracy and, specifically positioning accuracy of Machine Type Communication (MTC) devices.

LTE networks deploy various positioning techniques as a means of determining the current position (i.e., geographic location) of the device/UE. One such positioning technique that is widely deployed in the LTE network is Observed Time Difference of Arrival (OTDOA), which is a Radio Access Technology (RAT) dependent positioning technique. In principle, OTDOA relies on the device/UE receiving PRS signals transmitted from multiple base stations (i.e., all base stations within the network transmit PRS signals, and the device/UE receives PRS signals from specified base stations depending on the UE's current location within the network) and performs observed time difference of arrival (OTDOA) measurements as discussed in further detail below. These measurement results are then transmitted using an LTE positioning protocol (LPP) from the UE to a location server (LS) over the base station(s). The location server then performs positioning estimation calculations.

FIGS. 1A, 1B and 1C illustrate mappings for several types of references signals, namely, PRS signal mapping, CRS signal mapping, and PSS/SSS signal mapping, respectively.

Referring to FIG. 1A, which originates from 3GPP specification 36.211, PRS signal mapping is illustrated for one, two and four antenna ports. In the illustrated mappings the PRS symbol ($R_6$) has a diagonal pattern and is placed every sixth subcarrier; therefore the PRS signal has a reuse factor of six. The sub-frame that contains the PRS signal is dedicated for PRS transmission to avoid interference (i.e., the sub-frame always contains the PRS signal). It should be noted that the transmission of the PRS signal is reconfigurable. In this regard, the PRS signal can be transmitted across the entirety of the LTE system bandwidth. In addition, the PRS signal can be transmitted in N consecutive sub-frames with a certain duration of PRS periodicity, where N varies from 1 to 6 milliseconds (ms) and PRS periodicity varies from 160 to 1280 ms. In other words, the PRS signal may be repeated in up to six (6) consecutive sub-frames, but once the N subframes of the PRS signal are exhausted, the PRS signal is not again repeated until the entire frame is completed, i.e., in approximately 160 to 1280 sub-frames or milli-seconds. Thus, there are significant delays between instances of the PRS N sub-frames.

In response to receiving the PRS signals, the UE performs Observed Time Difference of Arrival (OTDOA) measurements. In accordance with specific embodiments of the invention, TOA measurements are calculated by performing cross-correlation on the received PRS signals and locally generated reference signals. Cross correlation from different transmission antennas, receiver antennas and sub-frames is accumulated for the purpose of obtaining exemplary cross-correlation peak. The measured time delay/time of arrival is subsequently determined from the phase information of the cross correlation peak. The previously described processes are repeated to obtain the time delay/time of arrival from several different base stations (e.g., a reference base station and neighboring base stations). OTDOA or Reference Signal Time Difference (RSTD) measurement is calculated by subtracting the time delay/time of arrival of neighboring base stations from the time delay/time of arrival of the reference (i.e., serving) base station. In response to determining RSTD measurements, the device/UE performs RSTD measurement quality assessments, such as classifying the RSTD measurement or the like. The UE subsequently transmits all of the RSTD measurements, RSTD measurement quality information, and device types (e.g., MTC device type) to the Location Server, via a reference base station, using LTE Positioning Protocol (LPP). In response to receiving the RSTD measurements and quality information, the LS performs positioning estimations.

The LTE cellular system is commonly deployed with a bandwidth in the range of 10 MHZ or 20 MHz. Since MTC devices are targeted to be operated in the narrow 1.4 MHz bandwidth, with the objective of reduced power consumption and reduced implementation cost, such devices are only capable of receiving a part of the overall PRS signal that is typically transmitted in the wider bandwidth.

Referring to FIG. 1B, which originates from 3GPP specification 36.211, CRS signal mapping is illustrated. The CRS signals have the primary purpose to assist data demodulation at the UE. CRS signals are transmitted in each base station antenna port, and the mapping of downlink CRS signals for the case of normal cyclic prefix is shown in FIG. 1B. The CRS signal is transmitted across the whole LTE system bandwidth, e.g., 20 MHz, and the CRS signal is transmitted during every sub-frame of a frame transmission (e.g., 1 ms periodicity), as further discussed with reference to FIG. 3 below.

Referring to FIG. 1C, PSS/SSS signal mapping is illustrated. The PSS and SSS signals have a primary purpose for the UE to perform time and frequency synchronization, cell detection, duplexing mode detection, and cyclic prefix type detection. The synchronization signals resource mapping of FIG. 1C shows the signal periodicity is every 5 sub-frames (e.g., 5 ms periodicity). Typically, the synchronization signals are transmitted in sixty-two (62) sub-carriers around the DC sub-carrier, i.e., within less than 1.4 MHz.

Referring now to FIG. 2, a diagram illustrates a User Equipment (UE), such as a Machine Type Communication (MTC) device, operating in an environment, in accordance with embodiments of the present invention. A network environment 200 is illustrated in accordance with one embodiment of the present invention. As illustrated in FIG. 2, the network system 208 is operatively coupled, via a network 201, which includes base stations/eNode-Bs, to the user equipment 204 and/or 206. In this configuration, the network system 208 may send information to and receive information from the user equipment devices 204 and/or 206, via network 201. In accordance with the present invention, the user equipment 204 and/or 206 are in network communication with base stations/e-Node-Bs 201 and the base stations/e-Node-Bs are in communication with network system 208 which includes a location server operatively configured to determine positioning estimations based on data sent from the user equipment 204 and 206, via base stations/e-Node-Bs 201.

FIG. 2 illustrates only one example of an embodiment of a network environment 200, and it will be appreciated that in other embodiments one or more of the systems, devices, or servers may be combined into a single system, device, or server, or be made up of multiple systems, devices, or servers.

The network 201 may be a telecommunication network, a global area network (GAN), such as the Internet, a wide area network (WAN), a local area network (LAN), or any other type of network or combination of networks. The network 201 may provide for wireline, wireless, or a combination wireline and wireless communication between devices on the network 201. In some embodiments, the user 202 is an individual who maintains cellular products with one or more providers.

As illustrated in FIG. 2, the network system 208 may be or include one or more base stations and/or access points and, in some embodiments, generally includes a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally includes a modem, server, or other device for communicating with other devices on the network 201, which may include, for example, transmitting reference signals to LTE devices.

As further illustrated in FIG. 2, the network system 208 includes computer-readable instructions 254 stored in the memory device 250, which in one embodiment includes the computer-readable instructions 254 of an application 258. In some embodiments, the memory device 250 includes data storage 252 for storing data related to and/or used by the application 258.

As illustrated in FIG. 2, the user equipment 206 (e.g., an MTC device) generally includes a communication device 236, a processing device 238, and a memory device 240. The processing device 238 is operatively coupled to the communication device 236 and the memory device 240. In some embodiments, the processing device 238 may send or receive data from the user equipment 204, and/or the network system 208 via the communication device 236 over a network 201. As such, the communication device 236 generally includes a modem, server, or other device for communicating with other devices on the network 201.

As further illustrated in FIG. 2, the user equipment 206 includes computer-readable instructions 242 stored in the memory device 240, which in one embodiment includes the computer-readable instructions 242 of an application 244. In the embodiment illustrated in FIG. 2, the application 244 allows the user equipment 206 to be linked to the network system 208 to communicate, via a network 201. The application 244 may also allow the user equipment 206 to connect directly (i.e., locally or device to device) with the user equipment 204. User equipment 204 (e.g., a mobile communication device, MTC device or the like) may include one or more components similar to those described with reference to user equipment 206.

It is understood that the servers, systems, and/or devices described herein illustrate one embodiment of the invention. It is further understood that one or more of the servers, systems, and devices can be combined in other embodiments and still function in the same or similar way as the embodiments described herein.

Referring now to FIG. 3, a diagram illustrates an exemplary reference signal transmission, in accordance with embodiments of the present invention. As noted above, MTC devices operate only in a narrow bandwidth, while the PRS signals are transmitted across the entire LTE channel bandwidth (e.g., 10 MHz), and positioning measurements that are based on a part or a sub-set of PRS results in a poor positioning accuracy.

As shown in the network configuration of FIG. 3, the PRS signal is only repeated every 160 sub-frames (or ms). Accordingly, other reference signals that are repeated more often, such as the CRS and synchronization signals, may be used for positioning measurements. Although the CRS and PSS/SSS signals are designed for other than positioning purposes, these signals can be used for positioning related measurements (i.e., RSTD). This solution obviates a need to transmit a new and improved (viz. PRS signals) positioning signal. While the CRS and PSS/SSS signals are less robust than the PRS signal, the PRS signal has lower interference, the PRS signal can be boosted, and if necessary, some PRS signals can be muted, the CRS and PSS/SSS signals may provide more accurate positioning measurements than the PRS signals due to their increased periodicity.

CRS and PSS/SSS signals may be used in multiple sub-frames in order to enhance positioning accuracy. As shown in FIG. 3, if a UE is stationary, then measurements can be based on longer window lengths. In other words, measurement window size may be adjusted, and generally speaking, the longer the window size, the more data may be collected, and the more accurate the resulting positioning measurements. On the other hand, if the UE is not stationary, then shorter measurement window sizes are more appropriate.

As shown, M1 refers to the measurement window length for CRS-based measurements, and M2 refers to the measurement window length for synchronization-based measurements. Both M1 and M2 may be adjusted so that the CRS-based measurement window and/or the synchronization-based measurement window are adjusted for earlier starts and/or later starts from the reference point. In case of CRS-based measurements, it is not necessary for the UE to listen within MTC bandwidth around the DC-subcarrier, especially if there is an active data transmission using the other frequency. Both M1 and M2 are controlled by the location server. For example, the location server may dictate that M1 is ten (10) sub-frames and that it has early or late start from a predetermined reference point. Such a relatively short window length may be reflective of the fact that one or more relevant UEs are non-stationary. Conversely, the location server may dictate, for example, that M2 is thirty (30) sub-frames and that it has early or late start from a predetermined reference point. Such a relatively long window length may be reflective of the fact that one or more relevant UEs are stationary. Further, the early start and/or late start of the measurement window may be determined based on the periodicity of the PRS signal, and the positioning accuracy based on on-going/existing positioning measurements (e.g. OTDOA measurements).

In some embodiments, the LS may request the UE provide enhanced positioning accuracy. In some cases, the LS also provides the window length of M1 and/or M2 as determined by the LS based on the mobility status of the UE and/or the measurement quality. The UE mobility status may be determined by one or more base stations in communication with the UE. If the base station(s) determine that the UE is operating in a normal mobility state, the LS may set M1 and/or M2 relatively longer than a medium mobility state or a high mobility state. In some embodiments, the UE sends a velocity status to a base station or the LS. This velocity status may be determined, for example, by the UE using a Doppler shift estimate. The base station and/or LS, in some embodiments, determines that M1 and/or M2 are relatively higher values, thereby indicating relatively longer measurement windows.

The measurement quality may be determined by the UE. If the measurement quality is determined to be poor or lower than the required threshold, then the window length may be modified. In some embodiments, the UE mobility is then used to determine the relative window length as described above.

In some embodiments, the UE measures the RSTD (or positioning measurement) using the CRS and/or the synchronization reference signals available within the M1 and/or M2 windows, respectively. In some cases, the UE also measures the RSTD of the CRS within the N PRS sub-frames, which all MTC devices typically receive. Moreover, in such embodiments of the invention, it should be noted that the PSS/SSS (Primary Synchronization Signals/Secondary Synchronization Signals) sub-frames and MBSFN (Multi-cast Broadcast Single Frequency Network) sub-frames include no Positioning Reference Signals (PRSs).

The UEs also determine the quality of positioning measurements for each CRS, synchronization and PRS signal. Then, the UE compares the quality of positioning signal to a threshold, which may be predetermined or contemporaneously determined. In some instances, the UE determines the quality of positioning measurement for the PRS signal and uses the determined quality as the threshold. In some cases, the UE communicates the RSTD of the CRS and/or synchronization signals only if their quality is greater than the threshold.

In various embodiments, the UE then transmits the measurements made, such as the PRS measurement, the CRS measurement and/or the PSS/SSS measurement. In some embodiments, only the measurements that meet the necessary level of quality are transmitted, and in some embodiments, the PRS measurement is always transmitted and other measurements are only transmitted if they meet or exceed the required quality level. In some cases, the measurements are transmitted along with their corresponding quality determinations and information linking each measurement with its respective quality determination.

Referring now to FIG. 4, a flowchart illustrates a method for improving User Equipment (UE) positioning accuracy in a mobile communication system in accordance with embodiments of the present invention. The first step, as illustrated by block 410, is to provide a UE configured to listen for PRS transmissions within an operating bandwidth around the DC sub-carrier and at least one non-PRS signal. In some embodiments, this bandwidth is a 1.4 MHz bandwidth, which is the bandwidth over which MTC devices are configured to operate.

The next step, represented by block 420, is to receive, at the UE and from one or more base stations, a transmission that includes at least one non-PRS signal. A non-PRS signal may be or include a CRS signal, a PSS signal, an SSS signal and/or the like. The next step, as represented by block 430, is to perform, at the UE, TOA measurements for each base station. The TOA measurements are based on the non-PRS signal. Then, UE calculates OTDOA measurements. In some cases, the UE also performs measurements of the PRS signal as well as the non-PRS signal. The next step, as represented by block 440, is to transmit, from the UE to a location server, the OTDOA measurements. The location server then performs a positioning estimation of the UE based on the OTDOA measurements.

The invention is not limited to any particular types of devices (either Machine Type Communication (MTC) devices or non-MTC devices). As used herein, a device may also be referred to as a UE, a system, or apparatus. Examples of devices include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable computing or non-computing devices.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory ("ROM"), an erasable programmable read-only memory ("EPROM" or Flash memory), a compact disc read-only memory ("CD-ROM"), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for improved User Equipment (UE) positioning accuracy in a mobile communication system, the method comprising:
   providing for a UE configured to listen for Positioning Reference Signal (PRS) transmissions within an operating bandwidth around Direct Current (DC) sub-carrier and at least one non-PRS transmission;
   receiving, at the UE, PRS and non-PRS transmissions transmitted from one or more base stations within the operating bandwidth;
   determining, at the UE, for each of the base stations, a PRS positioning measurement based on the PRS transmissions and a non-PRS positioning measurement based on the non-PRS transmissions;
   determining, at the UE, for each of the base stations, a non-PRS measurement quality corresponding to the non-PRS positioning measurement;
   comparing, at the UE, for each of the base stations, the non-PRS measurement quality to a measurement quality threshold; and
   transmitting, from the UE to a Location Server (LS), (i) the PRS positioning measurements, and in response to the comparing indicating that one or more of the non-PRS measurement qualities are greater than the measurement quality threshold, (ii) the non-PRS positioning measurements associated with the one or more non-PRS measurement qualities,
   wherein the LS performs a positioning estimation of the UE based on the received PRS positioning measurements and the non-PRS positioning measurements.

2. The method of claim 1, wherein providing for the UE comprises providing for a Machine Type Communications (MTC) UE configured to listen for the PRS and non-PRS transmissions within a Machine Type Communication (MTC) MTC operating bandwidth of approximately 1.4 MHz.

3. The method of claim 1, wherein the non-PRS transmission comprises a Common Reference Signal (CRS).

4. The method of claim 3, wherein the non-PRS transmission comprises a plurality of sub-frames and wherein each of the plurality of sub-frames of the non-PRS transmission comprises the CRS.

5. The method of claim 1, wherein the non-PRS signal comprises a synchronization signal.

6. The method of claim 5, wherein the synchronization signal comprises a Primary Synchronization Signal (PSS) and/or a Secondary Synchronization Signal (SSS).

7. The method of claim 5, wherein the non-PRS transmission comprises a plurality of sub-frames successive in time and wherein every fifth ($5^{th}$) sub-frame comprises the synchronization signal.

8. The method of claim 1, wherein the non-PRS transmission further comprises a positioning reference signal and wherein determining the non-PRS positioning measurements are further based on the positioning reference signal.

9. The method of claim 8, further comprising:
   receiving, at the UE from the LS, a request for enhanced positioning accuracy; and
   initiating, at the UE and in response to the request from the LS, determination of the PRS positioning measurements and the non-PRS positioning measurements.

10. The method of claim 8, further comprising:
    receiving, at the UE from the LS, an early/late start indicator, wherein the early/late start indicator indicates an early or late start in relation to a predetermined reference point for a window for determining the non-PRS positioning measurements based on the non-PRS transmissions; and
    wherein performing the non-PRS positioning measurements is further based on the received early/late start indicator.

11. The method of claim 1, wherein:
    the non-PRS transmissions comprise a first non-PRS signal and a second non-PRS signal;
    performing the non-PRS positioning measurements is based on the first non-PRS signal and the second non-PRS signal.

12. The method of claim 11, further comprising:
    receiving, at the UE from the LS, a request for enhanced positioning accuracy; and
    initiating, at the UE and in response to the request from the LS, determining the non-PRS positioning measurements based on the first non-PRS signal and the second non-PRS signal.

13. The method of claim 12, further comprising:
    receiving, at the UE from the LS, a first window length for performing measurements based on the first non-PRS signal;
    receiving, at the UE from the LS, a second window length for performing measurements based on the second non-PRS signal; and
    wherein performing non-PRS positioning measurements is further based on the received first window length and the received second window length.

14. The method of claim 13, further comprising:
    receiving, at the UE from the LS, an early/late start indicator, wherein the early/late start indicator indicates an early or late start in relation to a predetermined reference point for a window for determining the non-PRS positioning measurements based on the first non-PRS signal or the second non-PRS signal; and
    wherein performing non-PRS positioning measurements is further based on the received early/late start indicator.

15. The method of claim 1, further comprising:
    determining, at the UE, for each of the base stations, a PRS measurement quality corresponding to the PRS positioning measurement; and
    wherein, for each of the base stations, the measurement quality threshold is the corresponding determined PRS measurement quality.

16. The method of claim 15, further comprising:
transmitting, from the UE to the LS, the PRS measurement quality and information indicating the PRS measurement quality corresponds to the PRS positioning measurement; and
transmitting, from the UE to the LS, the non-PRS measurement quality and information indicating the non-PRS measurement quality corresponds to the non-PRS positioning measurement.

17. The method according to claim 1, further comprising:
receiving, at the UE from the LS, a window length for determining the non-PRS positioning measurements based on the non-PRS transmissions; and
wherein determining the non-PRS positioning measurements is further based on the received window length.

18. A mobile communication system for improved User Equipment (UE) positioning accuracy, the system comprising:
a plurality of base stations (BS);
a location server (LS); and
a user equipment (UE) operably connected to at least one of the base stations, the user equipment configured to:
listen for Positioning Reference Signal (PRS) transmissions within an operating bandwidth around Direct Current (DC) sub-carrier and at least one non-PRS transmission;
receive PRS and non-PRS transmissions transmitted from at least one of the base stations within the operating bandwidth;
determine, for each of the at least one base stations, a PRS positioning measurement based on the PRS transmissions and a non-PRS positioning measurement based on the non-PRS transmissions;
determine, for each of the at least one base stations, a non-PRS measurement quality corresponding to the non-PRS positioning measurement;
compare, for each of the at least one base stations, the non-PRS measurement quality to a measurement quality threshold; and
transmit, from the UE to the LS, (i) the PRS positioning measurements, and in response to the comparing indicating that one or more of the non-PRS measurement qualities are greater than the measurement quality threshold, (ii) the non-PRS positioning measurements associated with the one or more non-PRS measurement qualities,
wherein the LS is configured to perform a positioning estimation of the UE based on the received PRS positioning measurements and the non-PRS positioning measurements.

19. A computer program product, comprising a non-transitory computer-readable medium comprising computer-executable instructions for improved User Equipment (UE) positioning accuracy in a mobile communication system, the instructions comprising:
instructions for providing for a UE configured to listen for Positioning Reference Signal (PRS) transmissions within an operating bandwidth around Direct Current (DC) sub-carrier and at least one non-PRS transmission;
instructions for receiving, at the UE, PRS and non-PRS transmissions transmitted from base stations within the operating bandwidth;
instructions for determining, at the UE, for each of the at least one base stations, a PRS positioning measurement based on the PRS transmissions and a non-PRS positioning measurement based on the non-PRS transmissions;
instructions for determining, at the UE, for each of the at least one base stations, a non-PRS measurement quality corresponding to the non-PRS positioning measurement;
instructions for comparing, at the UE, for each of the at least one base stations, the non-PRS measurement quality to a measurement quality threshold; and
instructions for transmitting, from the UE to the LS, (i) the PRS positioning measurements, and in response to the comparing indicating that one or more of the non-PRS measurement qualities are greater than the measurement quality threshold, (ii) the non-PRS positioning measurements associated with the one or more non-PRS measurement qualities,
wherein the LS performs a positioning estimation of the UE based on the received PRS positioning measurements and the non-PRS positioning measurements.

* * * * *